United States Patent
Hong

(10) Patent No.: US 7,394,493 B2
(45) Date of Patent: Jul. 1, 2008

(54) CCD CAMERA UTILIZING AN IRIS AND METHOD FOR CONTROLLING THE SAME

(75) Inventor: Sung-Bin Hong, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 685 days.

(21) Appl. No.: 10/926,335

(22) Filed: Aug. 26, 2004

(65) Prior Publication Data

US 2005/0041126 A1 Feb. 24, 2005

Related U.S. Application Data

(63) Continuation-in-part of application No. 10/458,366, filed on Jun. 11, 2003, now Pat. No. 7,034,875.

(30) Foreign Application Priority Data

Nov. 18, 2002 (KR) ............................. 2002-71684

(51) Int. Cl.
*H04N 5/335* (2006.01)

(52) U.S. Cl. .................. 348/317; 348/320; 348/294; 348/363

(58) Field of Classification Search ............... 348/311, 348/317, 320, 322, 294, 363

See application file for complete search history.

(56) References Cited

U.S. PATENT DOCUMENTS

| 4,496,982 | A |   | 1/1985  | Levine |
|-----------|---|---|---------|--------|
| 5,382,975 | A |   | 1/1995  | Sakai et al. |
| 5,430,481 | A | * | 7/1995  | Hynecek ..................... 348/317 |
| 5,459,508 | A |   | 10/1995 | Fukushima |
| 5,546,127 | A | * | 8/1996  | Yamashita et al. .......... 348/297 |
| 6,118,485 | A | * | 9/2000  | Hinoue et al. ............... 348/373 |

* cited by examiner

*Primary Examiner*—Lin Ye
*Assistant Examiner*—Gevell Selby
(74) *Attorney, Agent, or Firm*—Roylance, Abrams, Berdo & Goodman, LLP

(57) ABSTRACT

A Charge Coupled Device (CCD) camera and a method for controlling the same. When a photographing command is input from the input unit by operation of user, the controller controls the iris drive unit so as to open and close the iris periodically for a preset time. Also, the control reads electric signals accumulated in the CCD imaging unit according to fields by light incident according to the opening of the iris, and then stores the read CCD data in the memory according to fields. Then, each CCD datum read from the CCD imaging unit is stored in the memory in the raw datum state without addition of an adjacent datum. Next, the controller generates a second odd field and a second even field by adding offset values, according to fields, to each CCD signal of the raw data state stored in the memory, and then forms a still image by combining the second odd field and the second even field.

10 Claims, 6 Drawing Sheets

FIG. 1
(PRIOR ART)
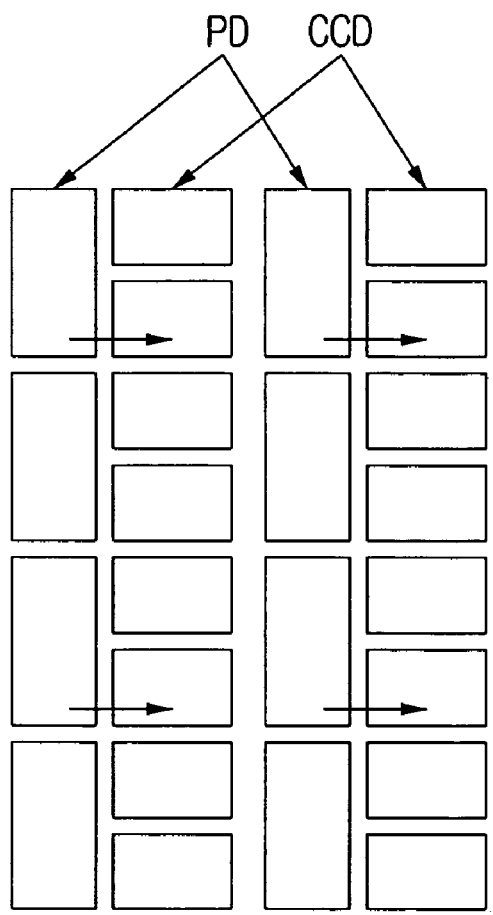
(a)
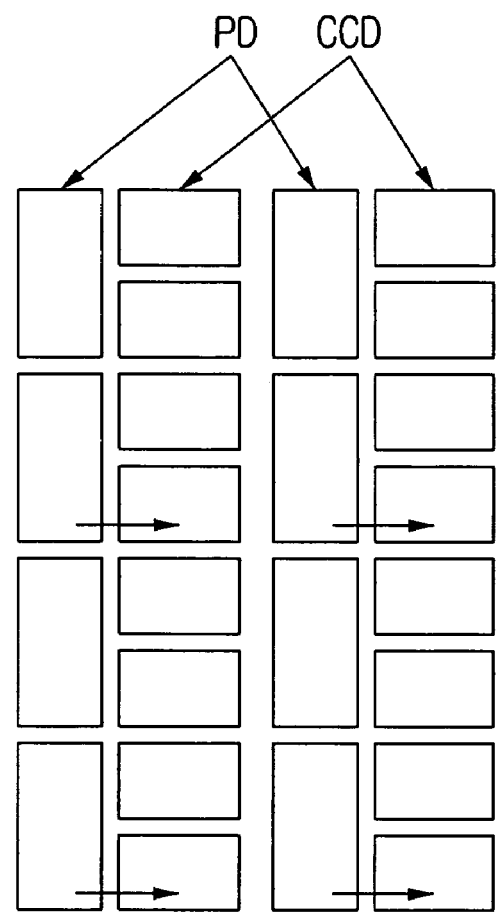
(b)

| 0000 | $A_n$ | $A_{n-1}$ | ••• | $A_{02}$ | $A_{01}$ | $A_{00}$ | odd A0 |
|---|---|---|---|---|---|---|---|
| 0002 | $B_n$ | $B_{n-1}$ | ••• | $B_{02}$ | $B_{01}$ | $B_{00}$ | even B0 |
| 0004 | $A_{1n}$ | $A_{1n-1}$ | ••• | $A_{12}$ | $A_{11}$ | $A_{10}$ | odd A1 |
| 0006 | $B_{1n}$ | $B_{1n-1}$ | ••• | $B_{12}$ | $B_{11}$ | $B_{10}$ | even B1 |
| ⋮ | ⋮ | | | | | ⋮ | ⋮ |
| nnno | $A_{nn}$ | • | • | • | • | • | odd An |
| nnne | $B_{nn}$ | • | • | • | • | • | even Bn |

FIG. 7

| |
|---|
| oddA0 |
| evenB0 |
| oddA1 |
| evenB1 |
| ⋮ |
| oddAn |
| oddBn |
| SECOND oddA0 |
| SECOND evenB0 |
| SECOND oddA1 |
| SECOND evenB1 |
| ⋮ |
| SECOND oddAn |
| SECOND evenBn |

FIRST REGION(300)
SECOND REGION(400)

CCD CAMERA UTILIZING AN IRIS AND METHOD FOR CONTROLLING THE SAME

This application is a continuation-in-part of Ser. No. 10/458,366, filed Jun. 11, 2003 now U.S. Pat. No. 7,034,875, the entire content of which is incorporated herein by reference. This application also claims benefit under 35 U.S.C. § 119 from Korean Patent Application No. 2002-71684, filed on Nov. 18, 2002, the entire content of which is incorporated herein by reference.

BACKGROUND OF THE INVENTION

1. Field of the Invention

The present invention relates to a digital camera, and more particularly, to a CCD camera using a plurality of CCDs (Charge Coupled Devices) and a method for controlling the same.

2. Description of the Related Art

As generally known in the art, a CCD camera is an apparatus which is designed to convert optical brightness into electrical amplitude signals using a plurality of CCDs, and then reproduce the image of a subject using the electric signals without time restriction. Such CCD cameras have been developed in close relation with televisions, and can operate in a frame output mode and a field output mode according to the data output methods of the CCD, similar to the scan mode of televisions.

In the frame output mode, as shown in FIG. 1, signal charges of the odd numbered pixels in the vertical direction of all the pixels (photodiodes PD) are first read in the photosensitive unit (see (a) of FIG. 1), and signal charges of the even numbered pixels are read at the next field (see (b) of FIG. 1). In this case, the frame output mode is also called a frame accumulation mode, since the duration for which signals of all pixels are accumulated corresponds to a two field period, which is referred to as "one frame period". Similarly, since it takes one frame period in reading all pixels, it is called a frame output mode.

In the frame output mode as discussed above, each pixel is independently read, so that resolution in the vertical direction is good. However, because the frame output mode requires a time of 1/30 second in order to accumulate all pixels, a so-called frame-after-image is generated. That is, when a subject moves or a camera pan is performed, the afterimage left from the previous field image is generated, which thus may reduce image quality.

In the field output mode as shown in FIG. 2, when data are read from the CCDs, added signal charges, each of which is made by adding signal charges of each odd numbered pixel and each corresponding even numbered pixel according to the vertical direction in the odd field, are read first (see (a) of FIG. 2). Subsequently, in the even field, signal charges of even numbered and odd numbered pixels are read in the changed combination (see (b) of FIG. 2). That is, signal charges of all pixels are read with only one field. Also, the storage duration for signals of all pixels is one field period, and thereby it is called a field accumulation mode or a field output mode.

A CCD camera using the field output mode comprises a frame using data of any one field of even/odd fields read by an addition operation. That is, one frame is formed by copying an original field read by the addition process, and then by overlapping the original field and the copied field so that their horizontal lines correspond. Then, the data of the other field, which is not copied, is used to determine luminance and color image for the copied field.

In the CCD camera using the field output mode as discussed above, although a still image is read by adding adjacent pixels, the read data are only half of the entire data for the original image. Hence, image quality is reduced.

Also, if a CCD camera including the field output mode is configured to embody a still image with both of the read fields, it has a higher resolution than the camera using the method to copy one field as described above. However, a blur is generated when a moving subject is photographed. That is, while the odd/even fields are read, the image of the next field moves farther to the moving direction due to light being incident continuously. Thus, when the prior and next fields are combined with each other, an enlarged image may be shown as compared to the original image.

SUMMARY OF THE INVENTION

Accordingly, the present invention has been made to solve the above-mentioned problems occurring in the known CCD cameras. Hence, an object of the present invention is to provide a CCD camera capable of removing blur by using both of the even and odd fields so as to improve the resolution of a still image, and a method for controlling the same.

In order to accomplish this object, an embodiment of the present invention provides a CCD camera comprising an input unit for receiving photographing commands; a CCD imaging unit, including a plurality of CCDs, for outputting electric signals according to incident light; a memory for storing the electric signals output from the CCD imaging unit; and a controller for reading the electric signals, which are accumulated in each CCD element of the CCD imaging unit by the incident light when a photographing command is input from the input unit, in a raw data state, for recording the read electric signals in the memory according to fields, and for composing a still image by adding offset values to the raw data of both an odd field and an even field recorded in the memory.

In this embodiment, the controller performs the exposure for the CCD imaging unit during one field period so as to obtain a still image.

Also, the controller records each horizontal line of the odd field and the even field so that they have alternating addresses in the memory.

Furthermore, the controller reads each CCD signal value of the odd field and each CCD signal value of the even field respectively in sequence from the memory, and adds offset values to the read odd field CCD signal values and the read even field CCD signal values to form a second odd field and/or a second even field by utilizing average values of the even field CCD signal values and the odd field CCD signal values. Meanwhile, the controller reads each CCD signal value of the odd field and each CCD signal value of the even field in sequence from the memory, and may add offset values so as to form a second odd field and/or a second even field by utilizing average values of the read even-field/odd-field CCD signal values and the preceding or following number's CCD signal values of the read odd-field/even-field CCDs. Furthermore, it is possible that the controller forms one field of second odd-field/even-field by utilizing average values of CCD signal values in sequence according to fields, and forms the other field of the second odd-field/even-field by utilizing average values of the preceding or following number's CCD signal values of read CCD signal values according to fields.

Also, the controller stores the second odd field and the second even field in a second region of the memory.

In addition, the CCD camera may comprise a second memory for storing the second odd field and the second even field. It is possible that the controller controls the second odd field and the second even field, to which offset values are added, to be stored in the second memory, not in a second region of the memory.

In order to accomplish this object, the present invention further provides a method for controlling a CCD camera, comprising the steps of exposing a CCD imaging unit for a preset time so as to generate a still image when a photographing command is inputted; reading electric signals in a raw state, the electric signals becoming accumulated in each CCD element of the CCD imaging unit through the exposure; recording the read raw data in the memory according to fields; and forming a still image by adding offset values to both an odd field and even field of the raw data recorded in the memory.

The step forming a still image comprises the steps of reading each CCD signal value of the odd field and each CCD signal value of the even field respectively in sequence from the memory; adding offset values so as to form a second odd field and/or a second even field by utilizing average values of the read odd field CCD signal values and the read even field CCD signal values; and forming a still image by combining the second odd field and the second even field.

According to the CCD camera and the method for controlling the CCD camera of the embodiments of the present invention, both fields forming one frame are utilized to compose a still image. Thus, resolution is higher, and also it is possible to provide a still image in which blur is removed, by performing offset compensation between fields.

BRIEF DESCRIPTION OF THE DRAWINGS

The above and other objects, features and advantages of the present invention will be more apparent from the following detailed description taken in conjunction with the accompanying drawings, in which:

FIG. 1 is a view for describing a frame output mode of a conventional CCD camera;

FIG. 7 is a view illustrating a format example in which_ CCD data read from a CCD imaging unit and data of a second odd field/a second even field generated on the base of the CCD data are recorded in a first and a second regions of a memory by the controller shown in FIG. 3.

DETAILED DESCRIPTION OF THE PREFERRED EMBODIMENTS

Figure 2:
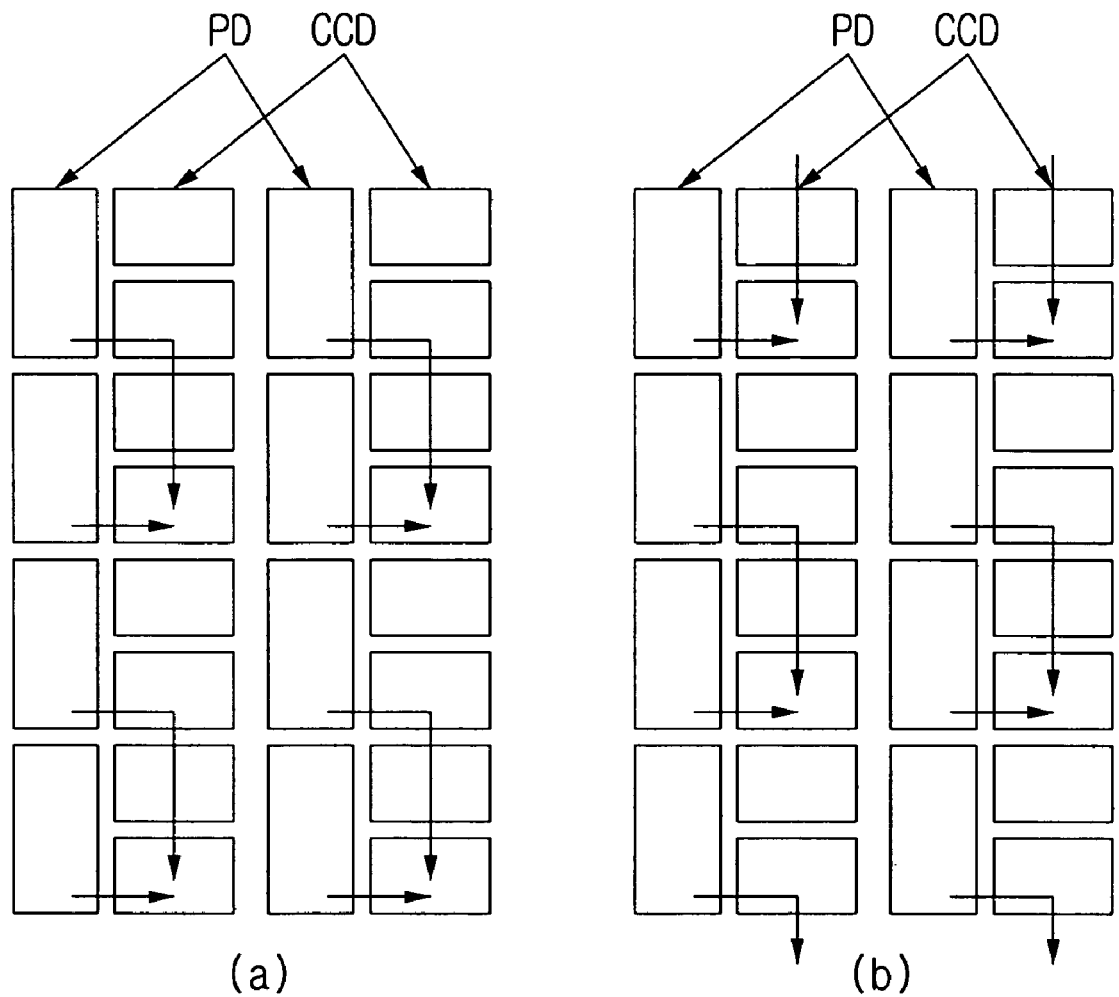
FIG. 2 is a view for describing a field output mode of a conventional CCD camera.

Hereinafter, a CCD camera and a method for controlling the same according to an embodiment of the present invention will be described with reference to the accompanying drawings. In the following description and drawings, the same reference numerals are used to designate the same or similar components, and so repetition of the description on the same or similar components will be omitted.

Figure 3:
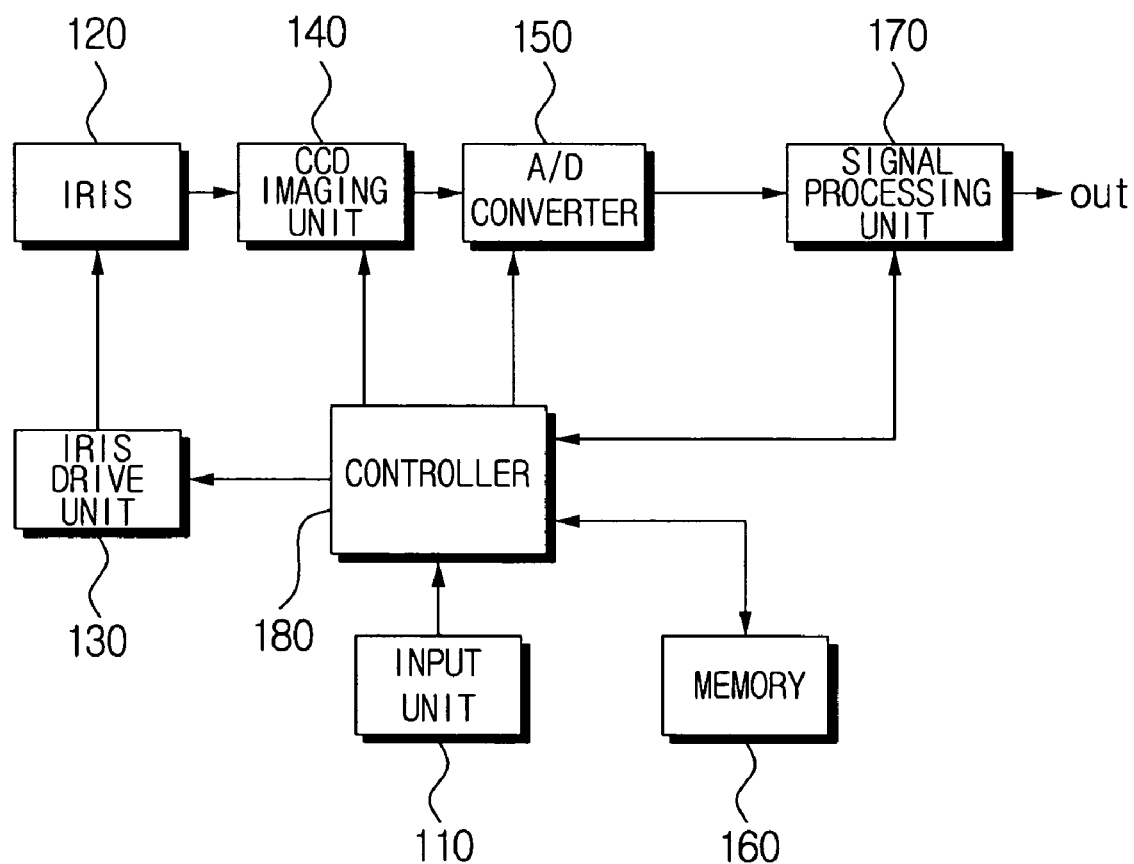
FIG. 3 is a schematic block diagram of a CCD camera according to an embodiment of the present invention.

FIG. 3 is a schematic block diagram of a CCD camera according to an embodiment of the present invention. The CDD camera includes an input unit 110, an iris 120, an iris drive unit 130, a CCD imaging unit 140, an analog/digital converter 150, a memory 160, a signal processing unit 170 and a controller 180.

The input unit 110 has photographing command keys for receiving photographing commands from a user, and control keys for providing various options to be used in photographing.

The iris 120 controls the receipt of incident light. The iris drive unit 130 opens and closes the iris 120 to a preset size for a preset time under the control of the controller 180. The CCD imaging unit 140, which includes a plurality of CCDs, receives light incident during the opening of the iris 120, and outputs electric signals corresponding to the incident light. The analog/digital converter 150 converts analog signals outputted from the CCD imaging unit 140 into digital signals.

The memory 160 stores the digital signals output through the analog/digital converter 150. Also, the memory 160 has a second region for storing data of a second odd field and a second even field that constitute a still image. The signal processing unit 170 performs signal processes, so as to record the digital signals output from the analog/digital converter 150 into the memory 160 and to output the CCD data signals recorded in the memory 160 to the outside.

The controller 180 adds offset with respect to the CCD signal in raw datum state which is stored in the memory 160. Such adding of the offset is performed with respect to the even field or the odd field which is read out during the opening of the iris. This is to compensate for the difference of the odd field or the even field which is read out during the opening of the iris in one case, and from the odd field or the even field which is read out during the closing of the iris in another case. Because the data read out during the closure of the iris has a different value from the data read out during the opening of the iris, due to the dark current generated during the closure of the iris, such differences can be compensated.

Figures 5, 6:
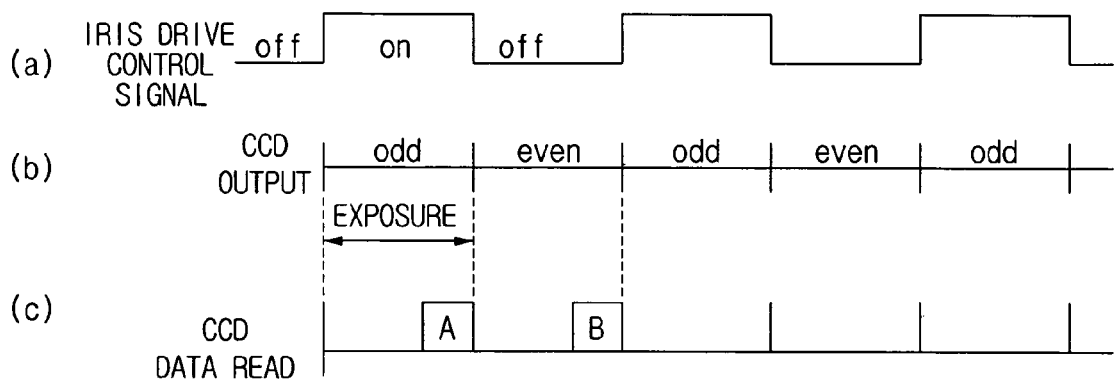
FIG. 5 is a timing diagram illustrating the signal processing relation of the CCD camera according to the operation of FIG. 4.
FIG. 6 is a view illustrating a format example in which CCD data read from an imaging unit are recorded in a memory by the controller shown in FIG. 3.

As shown in (a) of FIG. 5, the iris driving control signal is ON to open the iris for one field of time, while the iris driving signal is OFF to close the iris for another field of time. Also, as shown in (b) of FIG. 5, data is read from the odd field while the iris driving signal is ON, and the data is read from the even field when the iris driving signal is OFF. Accordingly, instead of the conventional way in which the data of one field is added and read for one field of time, according to the present invention, the raw data is read from the odd field for one field of time and read from the even field for one field of time, respectively. However, as shown in (c) of FIG. 5, despite the closure of the iris, the data read from the even field during light exposure would have a different value than the data from the odd field because of the dark current. Accordingly, to compensate for such a difference, offset is added (the offset may vary depending on the type of the image photographing device in use). Accordingly, current is measured during the opening and closing of the iris to calculate a dark current, and the calculated dark current is determined to be the offset value.

The controller 180 controls the whole system of the CCD camera. That is, when a photographing command is input from the input unit 110 by operation of a user, the controller 180 controls the iris drive unit 130 so as to open and close the iris 120 periodically for a preset time. Also, the controller 180 controls the CCD imaging unit 140 so as to enable electric signals, which have been incident through the opened iris 120 and accumulated in the CCD imaging unit 140, to be read according to fields, and then the controller 180 stores the read CCD data in the memory 160 according to fields. Then, each CCD datum read from the CCD imaging unit 140 is stored in the memory 160 in the raw datum state without addition of an adjacent datum. Also, the controller 180 generates a second odd field and a second even field by adding offset values to each CCD datum of the raw state stored in the memory 160 according to fields, and then forms a still image by combining the second odd field and the second even field.

Figure 4:
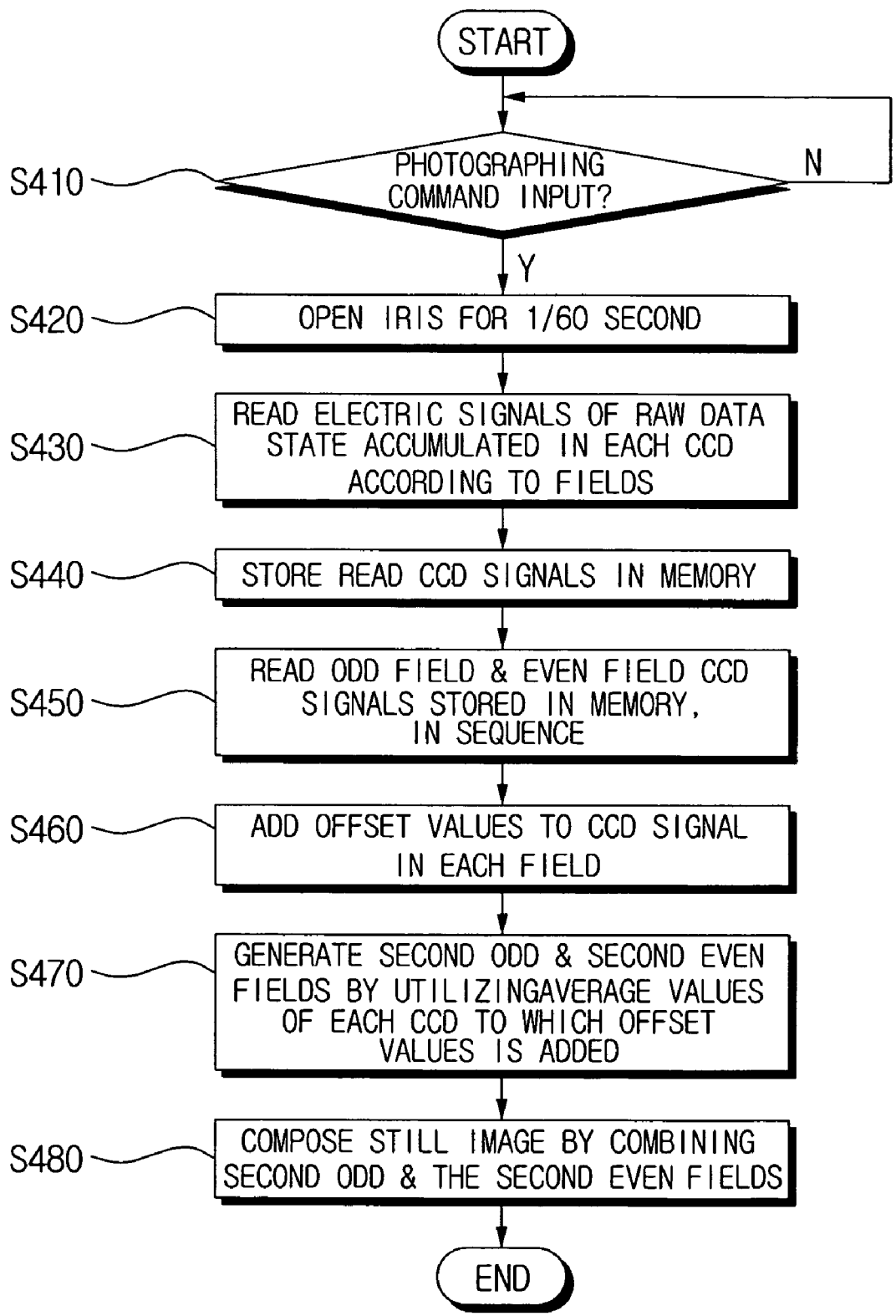
FIG. 4 is a flowchart illustrating an example of the operation of the controller shown in FIG. 3.

FIG. 4 is a flowchart illustrating an example of the operation of the controller shown in FIG. 3. When a photographing command is input through the photographing command keys in the input unit 110 by a user, the controller 180 controls the iris drive unit 130 as shown in (a) of FIG. 5 (step S410). That is, when receiving a photographing command, the controller 180 outputs an iris-on-control signal to the iris drive unit 130 to open the iris 120 (step S420). Subsequently, when one field period (1/60 second) has passed, the controller 180 outputs an iris-off-control signal to the iris drive unit 130 to close the iris 120. Therefore, the CCD imaging unit 140 is exposed during one field period as shown in (b) of FIG. 5, and the controller 180 reads electric signals accumulated in each CCD of the CCD imaging unit 140 in the raw data state, as shown in (c) of FIG. 5, to obtain a still image in one frame while the iris 120 is closed (step S430). Subsequently, the controller 180 stores the read CCD signals in the memory 160 according to fields (step S440).

FIG. 6 is a view illustrating a format example in which the read CCD signals are recorded in a memory 160. The CCD data read according to fields are recorded so as to have different addresses according to horizontal lines, while horizontal lines (odd A0~odd An) of the odd field and horizontal lines (even B0~even Bn) of the even field have addresses alternating with each other. That is, each horizontal line data set (odd A0~odd An) of the odd field read first are recorded in sequence, while emptying the alternate addresses so as to alternately record each horizontal line data set (even B0~even Bn) of the even field. Each horizontal line data set (even B0~even Bn) of even field read subsequently is sequentially recorded in the emptied addresses between each horizontal line data set (odd A0~odd An) of the odd field.

After this, the controller 180 reads the odd field CCD data ($A_{00}$~$A_{nn}$) and the even field CCD data ($B_{00}$~$B_{nn}$) respectively, in sequence, and at the same time (step S450). Then, the controller 180 adds offset values to the odd field CCD data ($A_{00}$~$A_{nn}$) and the even field CCD data ($B_{00}$~$B_{nn}$) (step S460). The addition of offset values, for example, may be achieved as follows. That is, with regard to the odd field, a second odd field is generated by determining CCD data of another odd field with average values of the odd field CCD data ($A_{00}$~$A_{nn}$) and the even field CCD data ($B_{00}$~$B_{nn}$), and also, with regard to the even field, a second even field is generated by determining CCD data of another even field with average values of the preceding or following CCD data of the odd field CCD data ($A_{00}$~$A_{nn}$) and the even field CCD data ($B_{00}$~$B_{nn}$). Furthermore, the addition of offset values can also be achieved as follows. After the controller reads each CCD signal value of the odd field and each CCD signal value of the even field in sequence from the memory, as previously, offset values are added to form at least one of a second odd field and a second even field by utilizing average values of the read even-field/odd-field CCD signal values and CCD signal values of preceding or following read odd-field/even-field CCDs. In a different way, both of the second odd field and the second even field may be generated by utilizing average values of each CCD datum read from each of the odd field and the even field (step S470). Then, the controller 180 forms luminance and color image signals by applying a color filter for image-quality improvement to each of the second odd field and the second even field.

Subsequently, the controller 180 stores again the CCD data of the second odd field and the second even field, in which offset values addition and color are applied as above, in the second region of the memory 160. FIG. 7 is a view illustrating a memory format of the second odd field and the second even field. Data read from the CCD imaging unit 140 are initially recorded in a first region 300 of memory 160, and the second odd field and the second even field generated with reference to the data recorded in the first region are recorded in a second region 400 of the memory 160. Then, the horizontal lines of each field are recorded so as to have addresses alternating with each other. Also, it is not necessary that the horizontal lines of each field are recorded so as to have addresses alternating with each other, but it is only necessary for each horizontal line to be recorded so that the controller 180 can read distinctive data of each horizontal line in both fields. Finally, by combining the second odd field and the second even field stored in the memory 160 according to necessity, a still image is composed (step S480).

According to the CCD camera and the method for controlling the CCD camera of the embodiments of the present invention discussed above, both fields forming one frame are utilized to compose a still image in using the memory, and thus it is possible to provide higher resolution. Also, in photographing a moving subject, the blue generated by reading time difference between both fields is removed by adding offset values to each of both fields, so that it is possible to provide more stable image quality to users.

Although several preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A photographing apparatus comprising:
   a Charge Coupled Device (CCD) imaging unit, including a plurality of CCDs, for outputting electric signals according to incident light;
   an iris for controlling the incident light;
   an iris drive unit for opening and closing the iris periodically for a preset time;
   a memory for storing the electric signals output from the CCD imaging unit; and
   a controller for controlling the iris drive unit so as to open and close the iris according to field periods, for alternately reading data of an odd field and an even field from the CCD imaging unit according to the field periods, and for storing the read data in the memory.

2. The photographing apparatus as claimed in claim 1, wherein the controller reads the data of the odd field during the opening of the iris, and reads the data of the even field during the closing of the iris.

3. The photographing apparatus as claimed in claim 1, wherein the controller stores the read data in the memory according to fields, and adds offset values to the data of the odd field or data of the even field stored in the memory so as to form an image.

4. The photographing apparatus as claimed in claim 3, wherein the offset values are dark currents obtained by computing currents measured when the iris is open and currents measured when the iris is closed.

5. The photographing apparatus as claimed in claim 3, wherein the offset values are added to the read data when the iris is open.

6. A method for controlling a photographing apparatus, which comprises a Charge Coupled Device (CCD) imaging unit, including a plurality of CCDs, for outputting electric signals according to incident light, and an iris for controlling the incident light, the method comprising:

opening and closing the iris according to field periods;

alternately reading data of an odd field and an even field from the CCD imaging unit according to the field periods; and storing the read data.

7. The method as claimed in claim 6, wherein the reading comprises reading the data of the odd field during the opening of the iris, and reading the data of the even field during the closing of the iris.

8. The method as claimed in claim 6, further comprising:
adding offset values to the stored data of the odd field or data of the even field so as to form an image.

9. The method as claimed in claim 8, wherein the offset values are dark currents obtained by computing currents measured when the iris is open and currents measured when the iris is closed.

10. The method as claimed in claim 8, wherein the offset values are added to the read data when the iris is open.

* * * * *